United States Patent

Ulrich

[15] 3,649,353

[45] Mar. 14, 1972

[54] SCREENED CIRCUIT CAPACITORS

[72] Inventor: Donald R. Ulrich, Liverpool, N.Y.

[73] Assignee: The United States of America as represented by the Administrator of the National Aeronautics and Space Administration

[22] Filed: Feb. 5, 1969

[21] Appl. No.: 796,685

[52] U.S. Cl. ....... 117/212, 29/25.42, 106/39, 106/46, 117/217

[51] Int. Cl. ....... B44d 1/18, H01g 13/00

[58] Field of Search ....... 117/212, 215, 217, 223; 106/39, 46; 29/25–42

[56] References Cited

UNITED STATES PATENTS

| | | | |
|---|---|---|---|
| 3,495,996 | 2/1970 | Delaney et al. | 117/39 |
| 3,317,653 | 5/1967 | Layer, Jr. et al. | 117/215 X |
| 3,274,025 | 9/1966 | Ostis | 117/215 X |
| 3,195,030 | 7/1965 | Herczog et al. | 106/39 X |
| 3,000,745 | 9/1961 | Clanchi | 106/39 |
| 2,956,219 | 10/1960 | Clanchi | 106/46 |

*Primary Examiner*—Alfred L. Leavitt
*Assistant Examiner*—Alan Grimaldi
*Attorney*—Howard J. Osborn, Wallace J. Nelson and G. T. McCoy

[57] ABSTRACT

This invention relates to material compositions suitable for dense high-dielectric thick films which can be deposited and processed in place, to recrystallization techniques to yield high-dielectric films and to methods of making screenable dielectric thick films.

7 Claims, 2 Drawing Figures

INVENTOR.
DONALD R. ULRICH

BY

ATTORNEYS

INVENTOR.
DONALD R. ULRICH

BY

ATTORNEYS

SCREENED CIRCUIT CAPACITORS

ORIGIN OF THE INVENTION

This invention was made by a former employee of the National Aeronautics and Space Administration and may be manufactured and used by or for the Government for governmental purposes without the payment of any royalties thereon or therefor.

This invention relates generally to materials and processes for high dielectric thick films for screened microcircuits and relates in particular to material compositions for dense high dielectric thick films which can be deposited in place, recrystallization techniques to yield high dielectric thick films, methods of making screenable dielectric raw materials for processing into homogeneous dense dielectric thick films and methods of making dielectric raw materials which can be processed into homogeneous dense bulk dielectrics.

Microelectronic circuitry development is becoming increasingly important in manufacturing spacecraft instrumentation, computers, and the like. Naturally, it is desirable to provide the various electrical components of these systems of the smallest size possible while maintaining the electrical values and characteristics required in a particular circuit. Screened hybrid microcircuits are now widely used and are prepared by the well-known process of screen printing and firing of passive thick film components such as conductors and resistors on ceramic substrates. To obtain dielectric constants greater than 100, ceramic capacitor ships and wire jumpers must be mechanically bonded to the screened circuit.

This prior art procedure has several disadvantages since failure can occur under mechanical stress due to the failure of the bonding material, electrical shoring of the jumper crossover can cause failure and manual or semimanual bonding techniques are required which create possible failure centers. It is thus seen that chip capacitors are used at a sacrifice of reliability and assembly time and with an increase in complexity. Without these mechanically bonded additives, most state of the art dielectric thick films consist of ceramic dielectric particles mechanically suspended in a lead monosilicate glass matrix. Because of the small content of high dielectric particles which can be packed into the low dielectric glass, the dielectric constants obtainable are generally less than 100. This mechanical suspension also results in low-density structures and therefore, high dissipation factors. Packing of the low dielectric glass with more than 35 percent by weight of high dielectric particles results in a highly porous unreliable crazed thick film.

It has also been proposed to use the screened process for forming capacitors having high dielectric constants by combining precise proportions of two or more of the ferroelectrical materials or perovskites in a glass binder and depositing the mixture in place. This process is complicated and time-consuming while still relaying on highly porous bonding material that is subject to failure under mechanical stress.

Accordingly, it is an object of the present invention to provide new material compositions for obtaining high dielectric thick films that may be deposited in place.

Another object of the present invention is the production of novel high dielectric thick films.

Another object of the present invention is a novel recrystallization technique to yield high dielectric films.

Another object of the present invention is a method of making screenable dielectric raw materials for processing into homogeneous dense dielectric thick films.

The foregoing and other objects are attainable in the present invention by compounding a glass frit containing a specific quantity of barnium oxide barium fluoride, titanium oxide, aluminum oxide, germanium oxide and silicon dioxide, mixing a quantity of this frit in the range of 10 to 90 weight percent with the remainder of the mix being barium titanate microcrystals on the order of 0.1 to 20 microns in diameter. This mixture is suspended in a binder-lubricant and screen-deposited in place on a suitable substrate containing a screened metal electrode. The screen-deposited film is then outgassed by drying in vacuum and heating to achieve complete binder burnout. After removal of the binder the mixture is heated between 700° and 1,300° C. for 5 to 15 minutes. This final heating step is to recrystallize the glass frit and bond the barium titanate microcrystals and recrystallized barium titanate frit, which consists of crystals on the order of 0.05 to 0.1 microns in diameter, into a solid dielectric. The solid dielectric becomes bonded to the electroded substrate at the temperature of the lowest melting component of the recrystallized glass frit which is lower than the sintering temperature of barium titanate. After cooling to room temperature the thick film dielectric is screened with a suitable top metallic electrode in a conventional manner.

A more complete appreciation of the invention and many of the attendant advantages thereof will be readily apparent as the same becomes better understood by reference to the following detailed description when considered in connection with the accompanying drawings wherein.

A more detailed explanation and complete understanding of the invention will be more apparent when considered in connection with the following specific examples.

EXAMPLE I

According to the present invention a barium titanate glass frit is compounded consisting, by weight essentially of 54.7% BaO, 3.2% $BaF_2$, 24.0% $TiO_2$, 7.9% $Al_2O_3$, 2.0% $GeO_2$, and 8.2% $SiO_2$ and mixing this frit with barium titanate ($BaTiO_3$) microcrystals. The frit mixture is formed from reagent grade chemicals which are dry-blended after weighing for 1 hour and ball-milled in distilled water. The water is removed by filtering and the material dried under an infrared lamp. After calcining in air at 1,000° C. for 1 hour and comminuting, the composition is melted at 1,450° to 1,600° C. and quenched to a glass frit in distilled water. The frit is milled and sifted through a 325-mesh screen.

This frit is mixed with barium titanate microcrystals which are on the order of 0.1 to 20 microns in diameter, and at a ratio of 10 to 90 weight percent to 90 to 10 weight percent of the barium titanate microcrystals. This mixture is blended thoroughly and a quantity of the total blend suspended in an organic binder and lubricant for screening. One suitable binder-lubricant formulation is 200 ml. of butyl cellosolve acetate to 21.5 grams of ethyl cellulose or other suitable soluble wax-type material to thicken the binder. Ethoxyl T-10 is one trade name under which ethyl cellulose may be readily obtained. The organic binder-lubricant is prepared by adding the butyl cellosolve acetate into a high speed blender and sifting the ethyl cellulose slowly into the binder. The mixture is blended for about 10 minutes and filtered with a 250-mesh screen. A screenable capacitor dielectric paste is formed by milling 100 grams of the dielectric mixture with 50 milliliters of binder and mixing this formulation in an automatic mortar and pestle for 2 hours. This final formulation is the finished capacitor dielectric paste and can be stored in ordinary airtight bottles until used.

This suspension is screen deposited in a conventional manner by a 165- or 200-mesh screen on a suitable substrate, such for example alumina, containing a previously deposited screened platinum or other metallic electrode.

Figure 1:
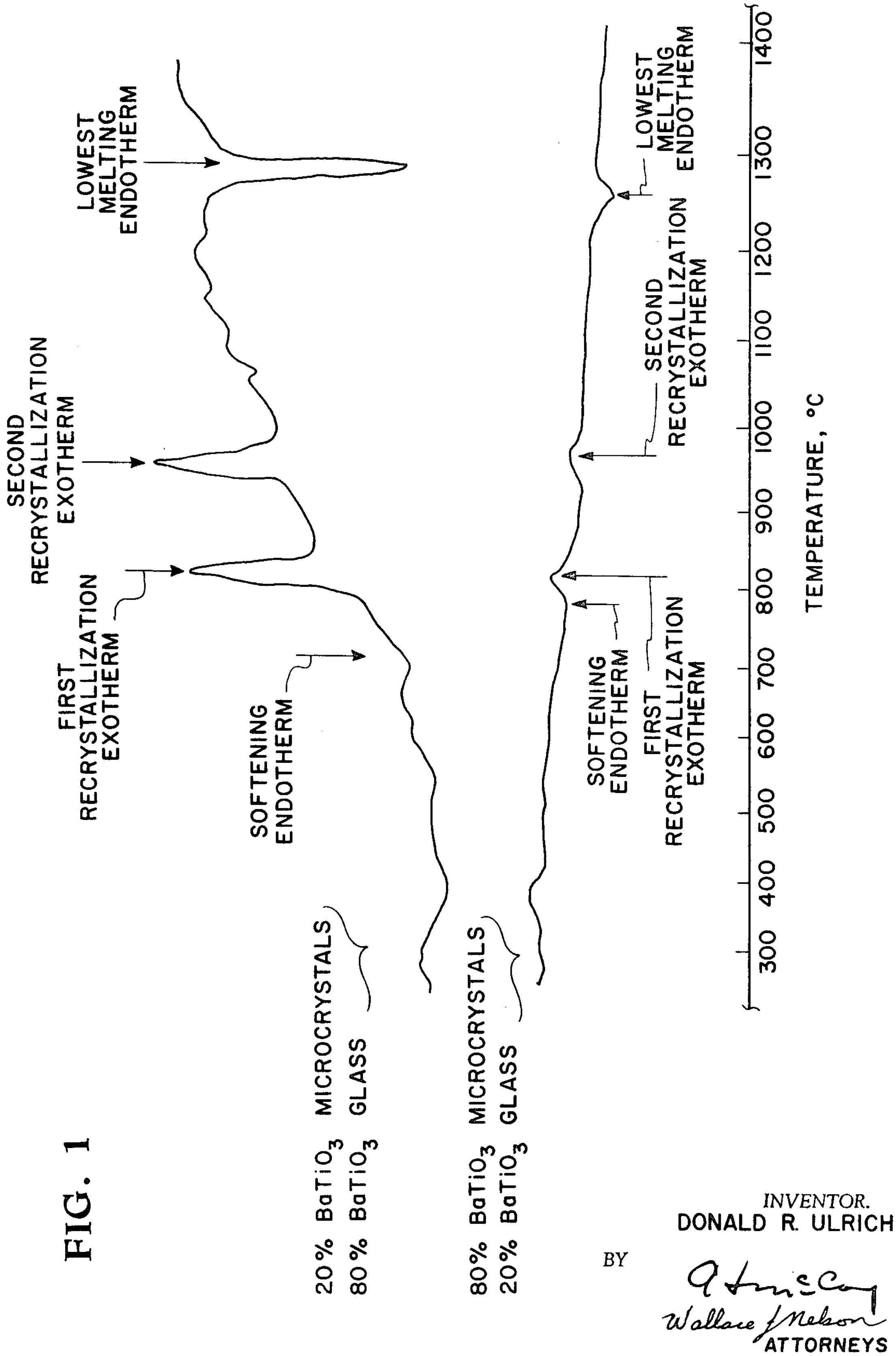
FIG. 1 is a graphical representation of a differential thermal analysis of the mixture of the barium titanate glass frit and barium titanate microcrystals illustrating the softening endotherm, the recrystallization exotherms and the melting endotherm.

When depositing the dielectric film, the optimum deposition thickness is 0.0008 ± 0.0001 inch. The two principle variables in determining the film thickness is the viscosity of the formulation and the screen mesh size. For a screenable formulation with optimum deposition thickness a viscosity of 100,000 ± 15,000 centipoises is recommended. This measurement was made using a Brookfield visiometer with a number 7 spindle at 10 r.p.m. It was found that small variations from the recommended viscosity were not deleterious but larger variations would give poor dielectric films. When the viscosity is below about 40,000 centipoises the films become thin and have poor line definition. Above 230,000 the formulation is substantially unscreenable and the films are very thick. Dielectric films with a surface area of 0.06 cm.$^2$ are suitable for use as capacitors. The screen-deposited film is outgassed by drying in vacuum, heating at 100° C., and soaking at 425° C. for 10 minutes to complete binder burnout. The dried mixture is then heated at a rate from 5° C./min. to 20° C./min. to a temperature in the range between 700° C., or the softening point endotherm preceding recrystallization, as indicated by differential thermal analysis (DTA), and 1,300° C., or the first melting endotherm following the final recrystallization exotherm, as indicated by DTA (See FIG. 1). A specific temperature is not given here because it may vary in different batches due to trace impurities but an operable temperature is readily obtainable from the DTA curve. This heating step is for recrystallization of the glass frit and for bonding of the barium titanate microcrystals and the recrystallized barium titanate frit crystals (which are on the order of 0.05 to 0.1 microns in diameter) into a solid dielectric. This solid dielectric becomes bonded to the electroded substrate at the temperature melting component of the recrystallized glass frit, which is lower than the sintering temperature of barium titanate. After cooling to room temperature or approximately 25° C. with furnace shutdown, the thick film dielectric is screened with a suitable top electrode in a conventional manner.

The fired film capacitors produced by the above-described process have dielectric constants of 300 to 1,800 at $10^2$ to $10^7$ Hz. and 25° C. depending upon the compositional ratio of the mixture and the firing schedule. Dissipation factors at $10^3$ Hz. and 25° C. are in the range of 0.75 to 1.25 percent.

At room temperature and 10 kHz., the dielectric constant of a capacitor formed from 20 parts barium titanate glass frit and 80 parts barium titanate microcrystals is 615± 25 while that for a capacitor formed from 80 parts barium titanate glass and 20 parts barium titanate microcrystals is 325± 10. These represent capacitance densities of 12,000 pf./cm.$^2$ (77,400 pf./in.$^2$) and 3,850 pf./cm.$^2$ (24,800 pf./in.$^2$).

Figure 2:
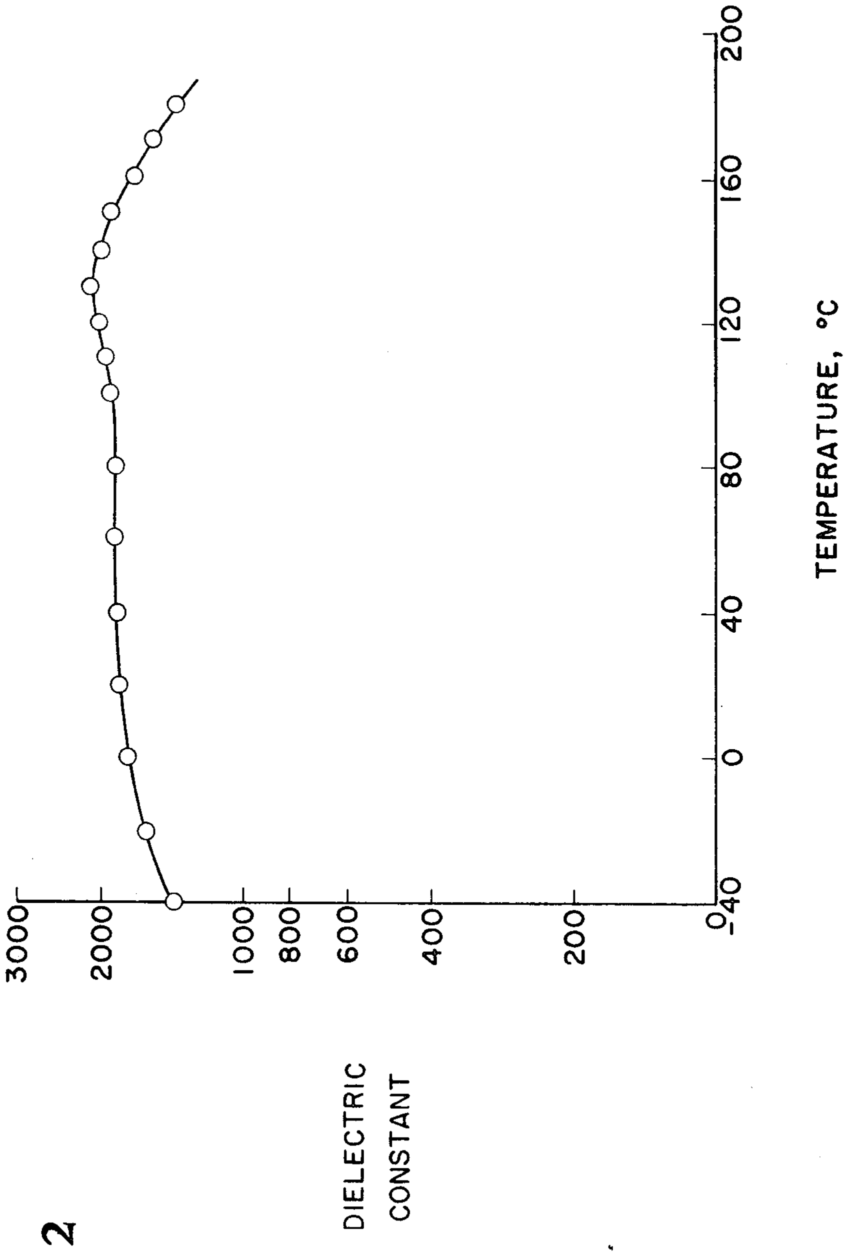
FIG. 2 is a graphical representation showing the temperature dependence of dielectric constant of thick films made in accordance with the present invention.

The temperature dependence of the dielectric constant of thick films produced according to the present process is shown in the graph of FIG. 2. This particular capacitor was formed from 10 parts barium titanate glass frit and 90 parts barium titanate crystals and is exemplary of all those between 10-90 parts barium titanate glass frit and 90-10 parts barium titanate crystals.

EXAMPLE II

A mixture of 80 percent by weight of barium titanate microcrystals and 20 percent by weight of barium titanate glass frit was prepared as in the preceding example and screen-deposited in place on an alumina substrate containing a platinum electrode. This deposit was fired at 250° per minute to 1,225°–1,250° C. for 30 minutes, cooled to room temperature at 250° C. per minute and then recrystallized at 1,050° C. for a soak period that may vary from 1 to 60 minutes depending on trace impurity content. Another layer was then screen-deposited on the first coating and recrystallized at 1,050° C. for a period of 10 minutes. The two layers were then fired up to 1,225°–1,250° C. at a rate 250° C. per minute, cooled to room temperature at 250° C. per minute and recrystallized at 1,050° C. for 60 minutes, cooled to room temperature and a top electrode deposited in a conventional manner.

EXAMPLE III

A capacitor was prepared as in Example II except the mixture consisted of 20 percent barium titanate microcrystals and 80 percent barium titanate glass frit.

EXAMPLES IV AND V

Mixtures of 80 percent by weight barium titanate microcrystals and 20 percent barium titanate glass frit and 20 percent barium titanate microcrystals and 80 percent barium titanate glass frit were separately prepared and screen-deposited in place on separate alumina substrates, each containing a platinum electrode. These deposits were recrystallized at 1,050° C. for 10 minutes, fired at 250° C. per minute to 1,225°–1,250° C. and held there for 30 minutes before being cooled to room temperature. An identical second coat was screened onto each of the first layer, the composites fired to 1,225°–1,250° C. at 250° C. per hour, soaked at this temperature range for 30 minutes, cooled to room temperature, recrystallized at 1,050° C. for 30 minutes, cooled to room temperature and a top electrode deposited in a conventional manner.

EXAMPLE VI

A glass frit was prepared by combining on a weight percent basis, 54.7% BaO, 3.2% $BaF_2$, 24.0% $TiO_2$, 7.9% $Al_2O_3$, 2.0% $GeO_2$ and 8.2% $SiO_2$ which, when melted into solution, contained the constituent oxides of the pervoskite compound $BaTiO_3$. This frit was deposited in place on an alumina substrate containing a screened metal (platinum) electrode and heated between 700° C. or the softening endotherm preceding the recrystallization exotherms as indicated by DTA, and 1,300° C. or the first endotherm of melting following recrystallization, as indicated by DTA, until the glass softened and fused to the electrode and recrystallized, in place, yielding the high dielectric barium titanate crystalline phase. A top electrode was then screen-deposited onto the glass layer by a conventional process.

EXAMPLE VII

The process as in Example VI was repeated and the recrystallized thick film subjected to a second recrystallization heat treatment at a temperature equivalent to but less than the first recrystallization temperature, and greater than the 700° C. or the softening point of the glass. The specific temperature may vary on a batch-to-batch basis depending upon the trace impurities, hence the use of the DTA curve as mentioned hereinbefore.

EXAMPLE VIII

The process as in EXAMPLE VI was repeated by applying a second deposit of the glass frit onto the top electrode and firing as in Example VI prior to the addition of a top electrode for the second layer. This buildup of layers may be repeated to provide a multiple-layered capacitor having alternate layers of conductors and dielectric with at least one of the conductors being attached to a metal lead and at least one other conducting layer being attached to a second metal lead. The entire layered structure is then subjected to a final-heating cycle wherein, at the resulting temperature of the lowest melting constituent of the recrystallized glass frit, the edges of the crystallized layers fuse and seal to the leads.

EXAMPLE IX

The process of Example I was repeated to provide a layered structure of alternate layers of conductors and dielectric material, leads attached to at least two of the conductor layers and the structure subjected to a final heat cycle wherein, at the melting temperature of the lowest melting constituent of the recrystallized glass frit, as indicated by DTA, the edges of the recrystallized glass layers fuse and seal to the leads.

The above specific examples are listed as exemplary examples only and are not to be considered as exhaustive but merely to illustrate to those skilled in the art some of the possibilities of the present invention. As will also be apparent to those skilled in the art the crystalline phase or phases of the recrystallized glass frit, as well as the barium titanate microcrystals may include one or more of the perovskite compounds, i.e., $PbTiO_3$, $KNbO_3$, $KTaO_3$, $NaNbO_3$, $LiNbO_3$ and others, in solid, solution or mixture thereof with the $BaTiO_3$ containing from 0 to 4 percent by weight of a metal of an oxide selected from the class consisting of Li, Na, K, Cu, Rb, Ag, Cs,Au,Be, Mg, Ca, Zn, Sr, Cd, Ba, B, Al, Sc, Ga, Y, In, La, Tl, Si, Ti, Ge, Zr, Sn, Hf, Pb, P, V, As, Nb, Sb, Ta, Bi, Cr, Se, Mo, Te, W, Fe, Co, Ni, Ru, Rh, Pd, Ir, Pt, As, Ce, Ps, Nd, Pm, Sm, Eu, Gd, Tb, Dy, Ho, Er, Tm, and Yb. Additionally, although a specific substrate, alumina, and a specific screened bottom electrode, platinum, has been used in the illustrative examples, it is readily apparent to those skilled in the art that any suitable substrate and conductive material may be substituted therefor without departing from the spirit or scope of the present invention.

The linear coefficients of expansion of the substrate, conductor, and dielectric films must be matched within close range to prevent the building of internal stresses causing crazing. This requirement is important in choosing the substrate material. Alumina was chosen because it has a linear coefficient of expansion of $6.5\times10^{-6}$ cm./cm./°C. from 25° C. to 300° C. and $7.9\times10^{-6}$ cm./cm./° C. from 300° to 700° C. This range is most desirable because there are a large number of glazes and frits whose linear coefficient closely approximates the $Al_2O_3$ coefficient. Also $Al_2O_3$ has excellent thermal shock properties which tolerate rapid-cooling during the firing cycle. For these reasons, substrate materials having ninety-six percent or greater of $Al_2O_3$ are recommended.

It is also recommended that the top electrode be fired at about 15° C. lower than the dielectric material while the bottom electrode should be fired about 15° C. higher than the dielectric to hold the holes in the dielectric due to gassing to a minimum.

The methods and materials described herein may also be employed for making in place an inorganic, metallic as well as intermetallic substrates, as well as a thick film to include piezoelectric, electro-optic, magneto-optic, ferromagnetic, paramagnetic, temperature coefficients of capacitance, thermistor bolometric (positive or negative temperature coefficient of resistance), dielectric crossover, and voltage tuning functions, interactions and materials.

Thus, there are obviously many modifications and variations of the present invention possible in the light of the above teachings. It is therefore to be understood that within the scope of the appended claims, the invention may be practiced otherwise than as specifically described.

What is claimed as new and desired to be secured by Letters Patent of the United States is:

1. The method of fabricating a capacitor having a high dielectric constant comprising the steps of:

a. providing a suitable substrate and screen depositing a first metallic electrode thereon, b. mixing a glass frit consisting of 54.7 percent barium oxide, 24.0 percent titanium oxide, 3.2 percent barium fluoride, 7.9 percent aluminum oxide, 2.0 percent germanium oxide, and 8.2 percent silicon dioxide, c. mixing a quantity of said glass frit in the range of 10 to 90 weight percent with a quantity of barium titanate microcrystals to complete the mixture, d. suspending the glass frit-microcrystal mixture in a binder-lubricant, e. screen depositing a film of the suspension onto said first metallic electrode, f. drying the deposited film in vacuum and heating the dried film at 100° C. for 10 minutes and soaking the film at 425° C. for 10 minutes to complete binder burnout, g. heating the film to a temperature in the range of 700° C. to 1,300° C. to recrystallize the glass frit and bond the barium titanate microcrystals and the recrystallized barium titanate frit crystals into a solid dielectric, said solid dielectric becoming bonded to the electroded substrate at the temperature melting component of the recrystallized glass frit, h. cooling the solid dielectric to room temperature, and i. screening the cooled film with a second metallic electrode.

2. The method of claim 1 wherein said frit ingredients are dry blended, after weighing, for 1 hour and ball-milled in distilled water, said water being removed by filtering and said blend-dried under an infrared lamp, calcining said dry blend at 1,000° C. for 1 hour and comminuting, melting the blend at 1,450°–1,600° C. and quenching to a glass frit in distilled water, milling and sifting said frit through a 325-mesh screen.

3. The method of claim 2 wherein said frit is mixed with barium titanate microcrystals which are on the order of 0.1 to 20 microns in diameter and at a ratio of 10 to 90 weight percent to 90 to 10 weight percent of the barium titanate microcrystals.

4. The method of claim 1 wherein said binder-lubricant consists of a mixture of 200 ml. of butyl cellosolve acetate to 21.5 grams of ethyl cellulose.

5. The method of claim 4 wherein 100 grams of the glass frit-microcrystal mixture is employed to 50 milliliters of said binder-lubricant, with the resulting suspension being blended in an automatic mortar and pestle for 2 hours to form a paste suitable for screen-depositing the dielectric film in place.

6. The method of claim 1 wherein a multilayered capacitor is formed by repeating the steps of claim 1 to add subsequent alternate layers of dielectric films and electrodes onto the first formed layers with at least two of said electrodes being connected to electric lead wires and including the step of subjecting the final layered structure to a final heating cycle wherein, at the resulting temperature of the lowest melting constituent of the recrystallized glass frit, the edges of the crystallized layers fuse and seal to the leads.

7. The method of claim 1 wherein the resulting capacitor is subjected to a second recrystallization heat treatment at a temperature equivalent to but less than the first recrystallization temperature and greater than the 700° C. or softening point of the glass frit.

* * * * *